Jan. 28, 1936.  H. J. COX  2,028,827
COMBINED VISOR AND VENTILATOR FOR MOTOR VEHICLES
Filed Nov. 12, 1934
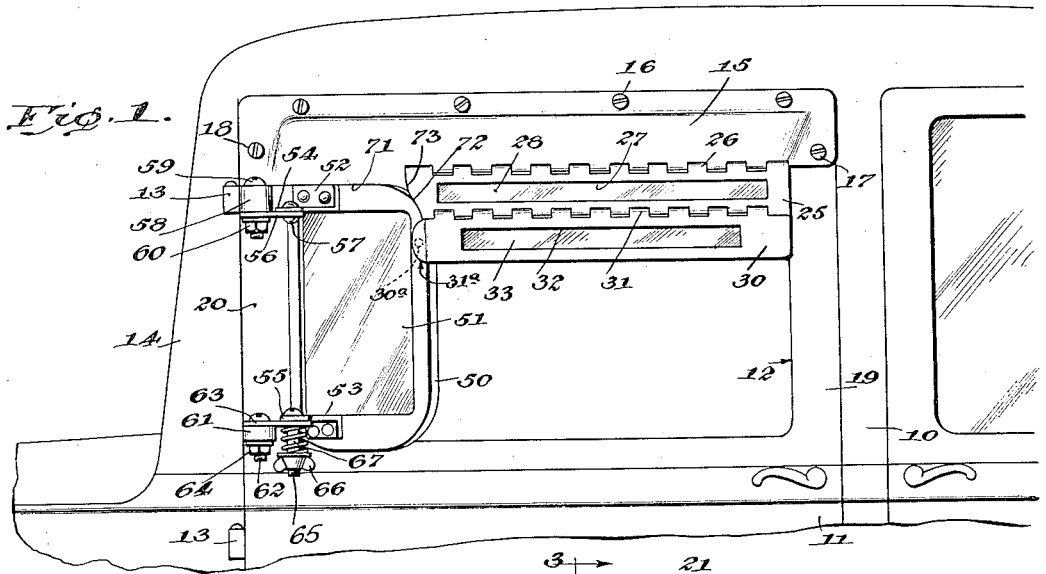
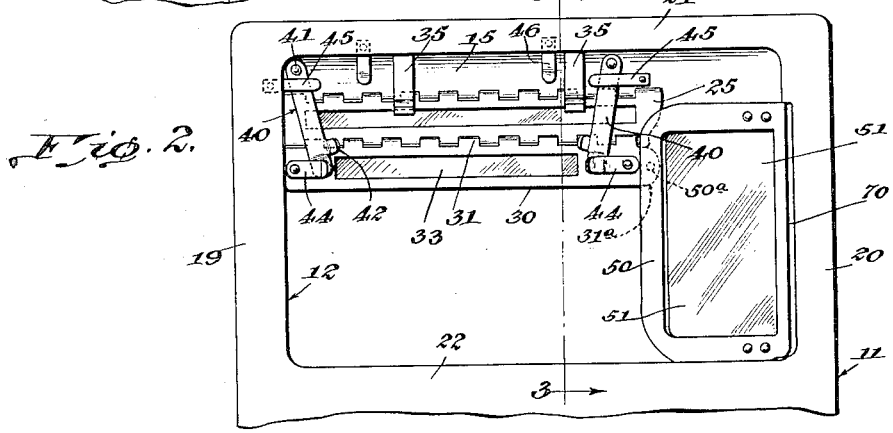
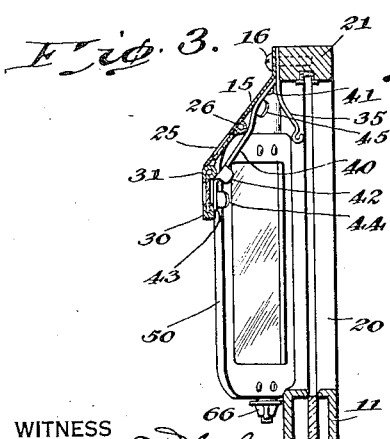
WITNESS
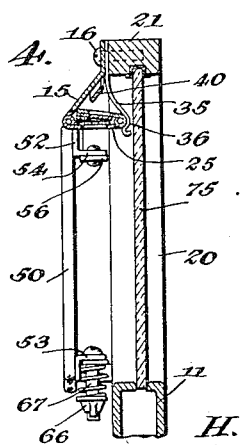
INVENTOR
H. J. Cox,
BY
Munn, Anderson, & Liddy
ATTORNEYS Patented Jan. 28, 1936

2,028,827

UNITED STATES PATENT OFFICE 2,028,827

COMBINED VISOR AND VENTILATOR FOR MOTOR VEHICLES

Henry J. Cox, New Orleans, La.

Application November 12, 1934, Serial No. 752,779

4 Claims. (Cl. 296—84)

This invention relates to a combined visor and ventilator for motor vehicles.

An object of the invention is the provision of a device adapted to be attached to a door of a motor driven vehicle for protecting the occupants of the car from rain, snow and the sun while permitting the proper circulation of air within the vehicle without creating a draft.

Another object of the invention is the provision of a combined visor and protective device adapted to be applied to the door frame of a motor vehicle for preventing snow and rain from entering the opening in the door while protecting the occupant adjacent the window from the sun, the device being so constructed that it may be folded to an inoperative position when its use is not required.

A further object of the invention is the provision of a collapsible device adapted to be applied to a door frame of a motor vehicle which will not only prevent snow and rain from entering the opening in the door but will protect an occupant adjacent the door from the sun, said device including a movable member which will control not only the direction of air current into the vehicle while preventing a draft, but which may be adjusted to control the amount of air entering the car while protecting an occupant adjacent the window from drafts.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a fragmentary view of a body of a motor vehicle showing my invention applied to the door of a car, Figure 2 is a view in elevation of the inside of the device as applied to a window in a door of a vehicle, Figure 3 is a transverse vertical section taken along the line 3—3 of Figure 2, and Figure 4 is a similar view showing the device folded in an inoperative position.

Referring more particularly to the drawing, 10 designates an automobile body having a door frame 11 provided with an opening 12 forming a window in the door. The door frame is hinged at 13 to the front corner post 14 of the vehicle. A metal plate 15 forming a stationary panel is secured along an edge at 16 to the upper end of the door frame above the opening 12 and at 17 and 18 to the side bars 19 and 20, respectively, of the door frame 11. The side bars 19 and 20, a top bar 21 and lower portion 22 of the door frame defines the opening 12.

A panel, generally designated by the numeral 25, is formed of metal as is the stationary panel 15 and is hingedly connected at 26 to the outer free edge of the stationary panel 15. The panel is provided with a central opening 27 which is closed by a transparent sheet of material 28 which permits light to pass through the interior of the vehicle but is of such a color that it will cut off the glare of the sunlight upon an occupant of the car adjacent the opening 12.

A second swingable panel 30 is also formed of metal and is hingedly connected at 31 to the outer edge of the panel 25. This panel is formed of metal and is provided with a central opening 32 which is closed by a transparent sheet of material 33 which will permit light to pass to the interior of the vehicle but which will cut off the glare of the sunlight.

The panel 30 may be folded upon the inner face of the panel 25, as shown in Fig. 4, and be held in a stationary horizontal position by means of spring clips 35 which have notches 36 adapted to engage the hinged portion 31 of the swingable panels 25 and 30. These spring clips are secured to the top bar 21 of the door frame by means of screws or bolts 16 which secure the stationary panel 15 to the top bar 21 of the door frame 11.

Spring latches 40 are pivoted at 41 to the inner face of the stationary panel 15. These latches are provided with a finger-piece 42 for conveniently operating the same. Said latches are spaced from the inclined outwardly projecting stationary panel 15 and the swingable panel 25 when said swingable panel is in an operative position, as shown in Fig. 3. The lower end of each latch, as shown at 43, is disposed in a vertical position and substantially parallel to the vertical position of the panel 30. A catch 44 is secured to the swingable panel 30 adjacent each latch 40 and is adapted to engage the portion 43 of each latch and maintain the latch in position when the swingable panels are in an operative position. A second catch 45 is secured to the inner face of the stationary panel 15 and also engages the latch member when it is in inoperative position.

A pair of latches 46, are secured to the stationary panel 15 and project downwardly and are adapted to engage the latches when they are moved into an inoperative position and in close association with the inner face of the stationary panel 15.

A swingable panel, generally designated by the numeral 50, includes a metal frame and a transparent section 51 which is formed of any suitable material and properly colored to protect an occupant of a car against the glare of the sun.

This panel is provided with brackets 52 and 53. The bracket 52 is provided with a lip 54 forming one part of a hinge. The bracket 53 is provided with a lip 55 which also forms part of a hinge.

The lip 54 rests upon a plate 56 and the lip 54 and the plate 56 are perforated to receive a pintle 57 for hingedly connecting the lip with the plate.

The plate 56 is adjustably secured to a bearing 58 by means of a bolt 59 and a nut 60, the bearing being secured to the side bar 20 of the door frame.

A second bearing 61 is secured to the door frame below the bearing 58 and in vertical alignment with the same. A bolt 62 passes through a perforation in a plate 63 and a nut 64 adjustably secures the plate 63 to the bearing 61.

The lip 55 and the plate 63 are provided with aligned passages through which is inserted a bolt 65 which has a wing nut 66 threaded onto its lower end. A spring 67 is located between the nut 66 and the plate 63. When the nut is drawn up tight the spring 67 will exert sufficient frictional resistance between the lip 55 and plate 63 for aiding in maintaining the panel 50 in a plurality of adjusted positions.

It will be noted that the brackets 52 and 53 are located intermediate the top and bottom members of the panel 50 so that the inner end 70 of the panel 50 is movable through an arc having a radius of less length than the radius of the arc through which the outer end of the panel swings.

The edge 71 of the stationary panel 15 is adapted to engage the upper edge of the panel 50 when said panel is in an operative position as shown in Figs. 1 and 3. The panel 50 is also curved at 72 to engage a curved portion 73 of the swingable panel 25 while the adjacent end of the panel 30 when in a vertical position engages the inner face of the panel 50 so that these panels when placed in the position shown in Figs. 1 and 3 will protect an occupant of the car adjacent to the opening 12 in the door frame from wind, rain, snow, and a direct draft. The transparent sections 28, 33, and 51 will permit sunlight to enter the vehicle but will cut off the glare due to the proper coloring of said sections.

A sliding transparent window pane 75 is adapted to close the opening 12 in the door when the swingable panels 25 and 30 are moved to an inoperative position, as shown in Fig. 4, and when the panel 50 is likewise moved to an inoperative position.

The swingable panel 50 may not only be moved to the positions shown in Figs. 1, 3 and 4 but this panel may be moved so that air will be forced into the interior of the vehicle past the occupant of the car who is adjacent the opening 12 without providing a direct draft of air on said occupant.

To protect the occupant adjacent the opening 12 from the glaring sun, the swingable panels 25 and 30 are lowered and fastened in position with the spring latches 40.

The panel 30 is provided with a curved lip 31ª that fits against the outer frame portion of the member 50 which is provided with a socket 50ª to receive a pin 30ª on the lip 31ª for aiding in retaining these parts in operative relation.

I claim:

1. A combined visor and ventilator for windows of automobiles comprising a door frame having an opening, a stationary panel secured to the frame above the opening and inclined at an angle to the horizontal, swingable panels higedly connected together with one of the panels being hingedly connected to the free edge of the stationary panel, the last-mentioned panel being movable to a position for alinement with the stationary panel, the other swingable panel assuming a vertical position, and means swingably mounted at a side of the opening and movable into engagement with the swingable panels for aiding in retaining the panels in a operative position, and co-operative means on the swingable panels and the swingable means for maintaining the relative positions of the panels.

2. A combined visor and ventilator for windows of vehicles comprising a wall of the vehicle having an opening, a stationary panel secured to and inclined outwardly from the frame above the opening, a pair of swingable panels hingedly connected together with one of the panels hingedly connected to the free edge of the stationary panel and dependent therefrom, latches formed of spring metal and pivotally mounted on the stationary panel, said latches each having an angular portion adapted to lie in flat contact with the outermost swingable panel when said panel is disposed in an operative vertical position, catches on said panel adapted to retain the latches in position, the other swingable panel being held in an inclined position and in substantially the same plane of the stationary panel.

3. A combined visor and ventilator for windows of automobiles comprising a door frame having an opening, a stationary panel secured to the frame above the opening and having a panel depending from the free edge of the stationary panel and hingedly connected thereto, a panel having a transparent section swingably mounted at one side of the opening of the door frame and movable into association with the depending panel for protecting the occupant of the car against rain and sunlight along two edges of the opening, a portion of the free edge of the swingable panel neatly fitting an outside end portion of the stationary panel, a free end of the depending panel engaging over the outer face of the free end of the swingable panel, said panels co-operating to divert rain from the opening while permitting ventilation.

4. A combined visor and ventilator for windows of automobiles comprising a door frame having an opening, a stationary panel secured to the frame above the opening and inclined at an angle to the horizontal, a panel depending from the free edge of the stationary panel and hingedly connected thereto, means for securing the depending panel in position, a panel having a transparent section swingably mounted on the door frame and along one side of the opening, the swingable panel movable into engagement with the stationary panel and cooperating means on the depending panel and the swingable panel for retaining the last-mentioned panels in operative relation, said panels cooperating to divert rain away from the opening while permitting ventilation.

HENRY J. COX.